United States Patent
Vogeley, Jr. et al.

(10) Patent No.: US 7,715,935 B2
(45) Date of Patent: May 11, 2010

(54) PREDETERMINING PORTIONING YIELD

(75) Inventors: Arthur William Vogeley, Jr., Seattle, WA (US); Robert L. Bottemiller, Bellevue, WA (US); George Blaine, Lake Stevens, WA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 11/319,763

(22) Filed: Dec. 27, 2005

(65) Prior Publication Data

US 2006/0162515 A1 Jul. 27, 2006

Related U.S. Application Data

(60) Provisional application No. 60/640,282, filed on Dec. 30, 2004.

(51) Int. Cl.
*G06F 19/00* (2006.01)
(52) U.S. Cl. ............ 700/97; 83/13; 83/39; 83/401; 100/41; 100/137; 700/28; 700/110; 700/230
(58) Field of Classification Search .......... 700/28, 700/56–59, 97, 110–114, 228, 230; 457/157
See application file for complete search history.

(56) References Cited

U.S. PATENT DOCUMENTS

| | | | | |
|---|---|---|---|---|
| 2,634,458 | A | * | 4/1953 | Elsaesser ............ 425/113 |
| 3,941,019 | A | * | 3/1976 | Baldwin et al. ......... 83/13 |
| 4,136,504 | A | * | 1/1979 | Wyslotsky ............ 53/435 |
| 4,557,019 | A | * | 12/1985 | Van Devanter et al. ... 452/157 |
| 4,576,071 | A | * | 3/1986 | Rayment ............ 83/76.8 |
| 4,868,951 | A | * | 9/1989 | Akesson et al. ....... 452/155 |
| 4,875,254 | A | * | 10/1989 | Rudy et al. .......... 452/157 |
| 5,064,667 | A | * | 11/1991 | Mally .............. 426/231 |
| 5,163,865 | A | * | 11/1992 | Smith .............. 452/157 |
| 5,184,733 | A | * | 2/1993 | Arnarson et al. ....... 209/585 |
| 5,481,466 | A | * | 1/1996 | Carey ............... 700/167 |
| 5,748,322 | A | * | 5/1998 | Konder et al. ........ 356/394 |
| 5,847,382 | A | * | 12/1998 | Koch et al. .......... 250/223 R |
| 5,944,598 | A | * | 8/1999 | Tong et al. .......... 452/158 |

(Continued)

FOREIGN PATENT DOCUMENTS

GB 2364894 2/2002

(Continued)

*Primary Examiner*—Paul L Rodriguez
*Assistant Examiner*—Carlos Ortiz Rodriguez
(74) *Attorney, Agent, or Firm*—Christensen O'Connor Johnson Kindness PLLC

(57) ABSTRACT

A system and method for determining how food products might be portioned includes a scanner for scanning the food product and then using a computer to analyze the scanning data to develop a volume distribution of the food product. The computer operating scanning software carries out modeling to determine potential sets of end products achievable from the initial work product, taking into consideration the possibility of adjusting the thickness of the food product, either before or after cutting of the food product occurs. The computer evaluates the potential yield provided by the potential sets of end products and then one of the potential sets of end products is selected. Thereafter, the present system or a further portioning system is used to cut and optionally adjust the thickness of the food product, either before or after the cutting occurs, thereby to achieve the selected end product set.

12 Claims, 7 Drawing Sheets

U.S. PATENT DOCUMENTS

| | | | |
|---|---|---|---|
| 6,129,625 A * | 10/2000 | Cate et al. | 452/127 |
| 6,164,174 A * | 12/2000 | Sigurdsson et al. | 83/13 |
| 6,186,059 B1 * | 2/2001 | Mello et al. | 100/35 |
| 6,449,334 B1 * | 9/2002 | Mazess et al. | 378/53 |
| 6,563,904 B2 * | 5/2003 | Wijts et al. | 378/58 |
| 6,604,991 B1 * | 8/2003 | Jurs et al. | 452/150 |
| 6,973,765 B2 * | 12/2005 | Melville | 53/456 |
| 7,044,846 B2 * | 5/2006 | Eilertsen | 452/161 |
| 2003/0145699 A1 * | 8/2003 | Kim et al. | 83/13 |
| 2005/0032471 A1 | 2/2005 | Pfarr et al. | |

FOREIGN PATENT DOCUMENTS

| | | |
|---|---|---|
| GB | 2409801 A | 7/2005 |

* cited by examiner

PREDETERMINING PORTIONING YIELD

CROSS-REFERENCE TO RELATED APPLICATION

This application is based on and claims the benefit of U.S. Provisional Application No. 60/640,282, filed Dec. 30, 2004.

TECHNICAL FIELD

The present invention relates to processing work products, and more specifically to an apparatus and process for estimating and optimizing the yield from portioning work products, such as food products.

BACKGROUND

Work products, including food products, are cut or otherwise portioned into smaller portions by processes in accordance with customer needs. Also, excess fat, bone and other foreign or undesirable materials are routinely trimmed from the food products. Much of the portioning/trimming of work products, in particular food products, is now carried out with the use of automated portioning machines. These machines use various scanning techniques to ascertain the size and shape of the work product as it is being advanced on a moving conveyor. This information is analyzed with the aid of a computer to determine how to portion the work product into the desired sizes, weights or other criteria being used. For example, if work product portions of a specific weight are desired, the information from the scanner may be employed to control the operation of a crosscutting device to cut the work product into the desired portioning sizes. If the work product changes in width or thickness or other physical parameter along its length, the location of the crosscut made in the work product to achieve a desired end portion weight may be controlled. The apparatus may operate in this manner until the work product has been entirely portioned, which may result in a residual unusable section of the initial work product which is smaller in weight or size than the required weight or size.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A scanner is used to scan a work product, and the scanning data is analyzed by a computer operating under scanning software to determine how the work product could be portioned into a set of desired end products. The computer, using the scanning software, models the work product taking into consideration the information from the scanning of the work product as well as subsequent processing options on the work product. The computer, operating the scanning software, analyzes how the modeled work product may be divided into a set of end products of pre-specified weights, thicknesses, areas, shapes, etc. The yield from the work product may be calculated based on the resulting set of end products by either the scanning software and/or portioning software associated with a portioning system. The computer, using the scanning program or the portioning system, determines how the work product could be cut, sliced or otherwise processed to arrive at the set of end products. The processing options on the work product may include slicing the work product either before or after cutting the work product into portions. Other processing options include flattening of the work product either before or after the work product has been cut into portions. The modeling of the work product takes into consideration slicing or flattening of the work product either before or after the work product has been cut into portions.

The modeling of the work product may also take into consideration defects in the work product, such as tears, holes, fat, bone, cartilage or other undesirable or foreign material in the work product. Such defects may be revealed by the scanning of the work product and subsequent analysis of the scanning data.

Analyzing the work product under potential processing alternatives results in the predetermination of potential end product sets and the corresponding yield achieved therefrom. This information can be used by the scanning software and/or portioning software to select the manner in which the work product is to be processed to achieve the desired yield.

DESCRIPTION OF THE DRAWINGS

The foregoing aspects and many of the attendant advantages of the present embodiments will become more readily appreciated as the same become better understood by reference to the following detailed description, when taken in conjunction with the accompanying drawings, wherein.

DETAILED DESCRIPTION

Figure 1:
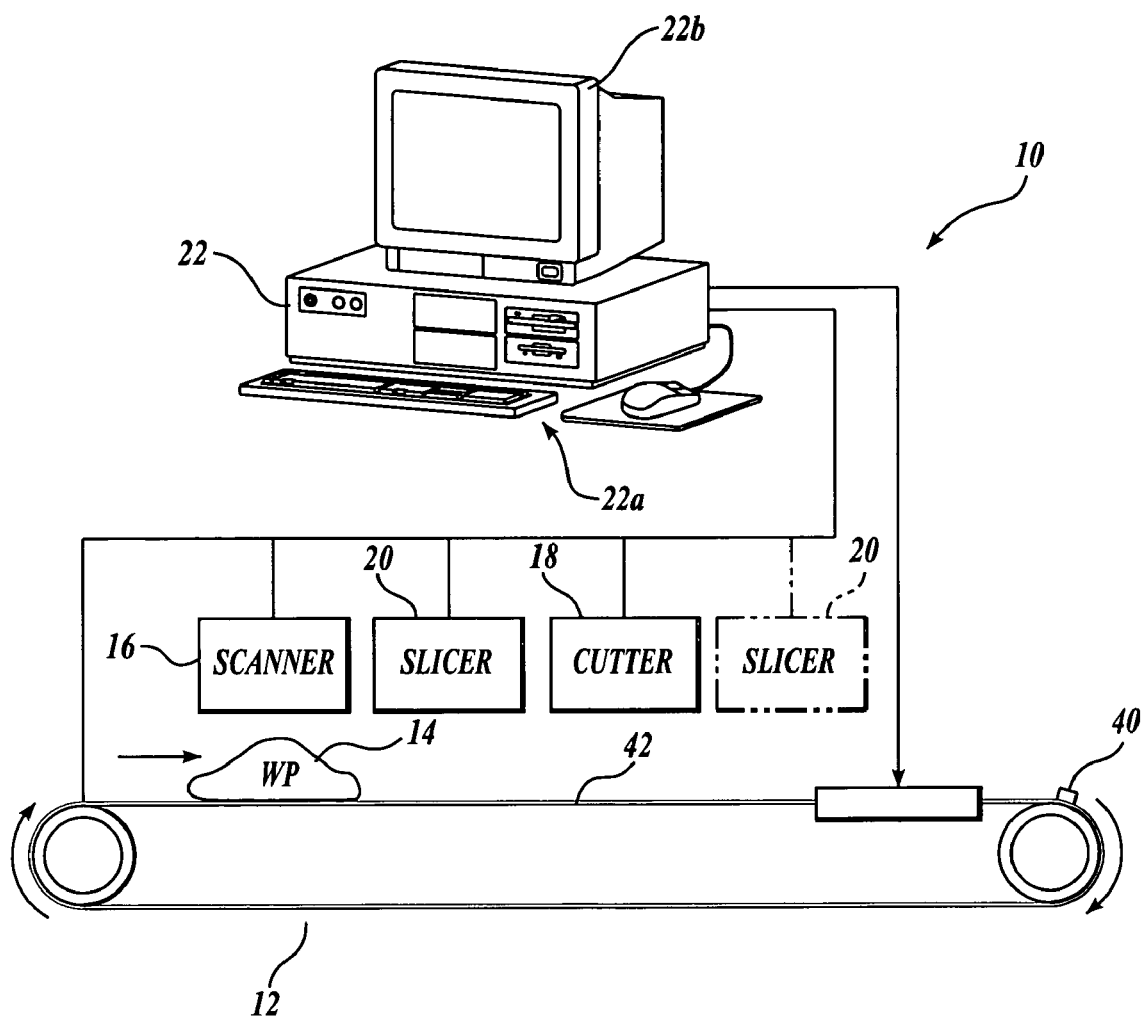
FIG. 1 is a schematic view of a disclosed embodiment.

FIG. 1 schematically illustrates a system 10 suitable for implementing an embodiment of the present invention. The system 10 includes conveyor 12 for carrying a work product 14 to be portioned. Although one conveyor 12 is illustrated, system 10 may utilize more than one conveyor, for example, a loading conveyor, a processing conveyor and an unloading conveyer. In a scanning aspect, the system 10 includes a scanner 16 for scanning the work product 14. In a portioning aspect, system 10 may include a cutter 18 for cutting the work product into one or more end pieces of desired sizes or other physical parameters. The portioning aspect of system 10 may also include a slicer 20 which is schematically illustrated as interposed between the scanner and the cutter. FIG. 1 also illustrates that the slicer 20, shown in broken line, may instead be located downstream from the cutter 18. The conveyor 12 and the scanner 16 are coupled to, and controlled by, processor or computer 22. The cutter 18 and slicer 20 are shown as coupled to the same computer 22, but may be instead coupled to a different computer, not shown. As illustrated, the processor/computer includes an input device 22a (keyboard, mouse, etc.) and an output device 22b (monitor, printer, etc.).

Figure 2:
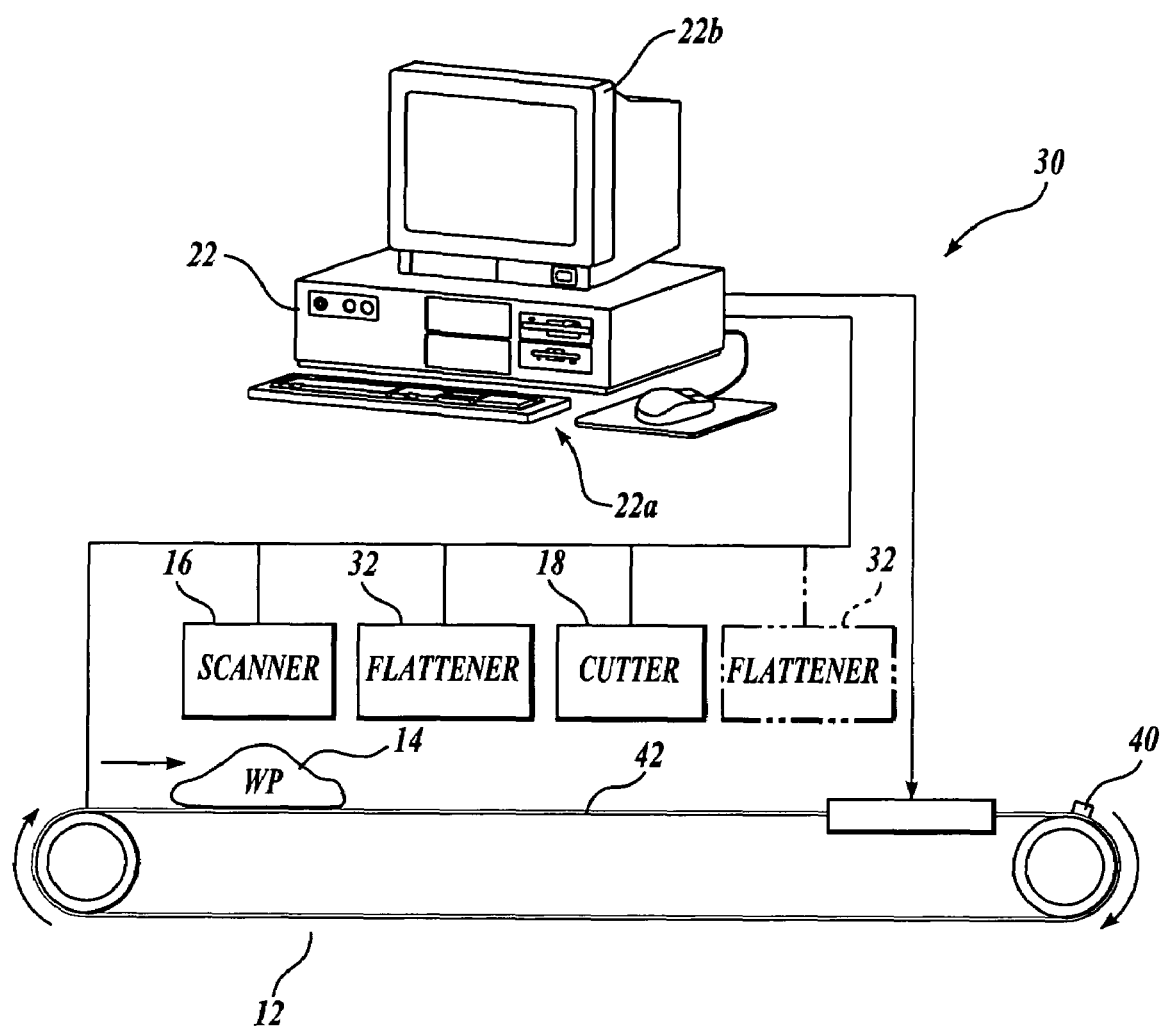
FIG. 2 is a schematic view of another embodiment.

FIG. 2 illustrates a system 30 also suitable for implementing an embodiment of the present invention. The system 30 is similar to the system 10. As such, the components of system 30 that correspond to system 10 are represented by the same part numbers. One difference in system 30 is that the slicer 20 of system 10 is replaced by a flattener 32 capable of flattening the work product 14 to a specified thickness. Although the flattener 32 is illustrated as located upstream from the cutter 18, the flattener 32, shown in broken line in FIG. 2, may instead be located downstream of the cutter 18.

Generally, the scanner 16 scans the work product 14 to produce scanning information representative of the work product, and forwards the scanning information to the processor/computer 22. The processor/computer, using a scanning program, analyzes the scanning data to develop a thickness profile of the scanned work product. The processor/computer also develops an area and/or volume distribution of the scanned work product. The processor/computer 22 then can model the work product to determine how the work product might be divided into end product sets composed of one or more end products of specific physical criteria, including, for example, weight, shape, thickness, length, or width. In this regard, the processor/computer takes into consideration that the thickness of the work product may be altered either before or after the work product is portioned by the cutter 18. The processor/computer in addition factors in any defects found in the work product during the scanning process. The yield of the potential end product sets is determined using either the scanning program and/or a separate portioning program associated with cutter, slicers and/or other portioning equipment. Based on such yield determination, a specific end product set is selected. The processor/computer, using the scanning program or the portioning program, determines how the work product may be portioned into one or more end product sets. The processor 22, using the portioning software, then controls the cutter 18 as well as the slicer 20, or the flattener 32, to portion the work product according to the selected end product set. Rather than immediately cutting, slicing, flattening, etc., the work product, the work product may be initially sorted into groups for later processing. These groups may include work products to be: cut then sliced; sliced then cut; cut then flattened; flattened then cut, etc.

Describing the foregoing systems method in more detail, the conveyor 12 carries the work product 14 beneath the scanning system 16. The scanning system may be of a variety of different types, including a video camera (not shown) to view a work product 14 illuminated by one or more light sources. Light from the light source is extended across the moving conveyor belt 42 to define a sharp shadow or light stripe line, with the area forwardly of the transverse beam being dark. When no work product 14 is being carried by the infeed conveyor 12, the shadow line/light stripe forms a straight line across the conveyor belt. However, when a work product 14 passes across the shadow line/light stripe, the upper, irregular surface of the work product produces an irregular shadow line/light stripe as viewed by a video camera angled downwardly on the work product and the shadow line/light stripe. The video camera detects the displacement of the shadow line/light stripe from the position it would occupy if no work product were present on the conveyor belt. This displacement represents the thickness of the work product along the shadow line/light stripe. The length of the work product is determined by the distance of the belt travel that shadow line/light stripes are created by the work product. In this regard, an encoder 40 is integrated into the infeed conveyor 12, with the encoder generating pulses at fixed distance intervals corresponding to the forward movement of the conveyor.

In lieu of a video camera, the scanning station may instead utilize an x-ray apparatus (not shown) for determining the physical characteristics of the work product, including its shape, mass, and weight. X-rays may be passed through the object in the direction of an x-ray detector (not shown). Such x-rays are attenuated by the work product in proportion to the mass thereof. The x-ray detector is capable of measuring the intensity of the x-rays received thereby, after passing through the work product. This information is utilized to determine the overall shape and size of the work product 14, as well as the mass thereof. An example of such an x-ray scanning device is disclosed in U.S. Pat. No. 5,585,603, incorporated by reference herein. The foregoing scanning systems are known in the art and, thus, are not novel per se. However, the use of these scanning systems in conjunction with the other aspects of the described embodiments are believed to be new.

The data and information measured/gathered by the scanning device(s) is transmitted to the processor/computer 22, which records the location of the work product 14 on the conveyor 12, as well as the length, width and thickness of the work product about the entire area of the work product. With this information, the processor, operating under the scanning system software, can develop an area profile as well as a volume profile of the work product. Knowing the density of the work product, the processor can also determine the weight of the work product or segments thereof.

The scanning information can also be used by the computer to ascertain whether there are any defects in the work product. Such defects might include tears, holes, fat, bone, or cartilage. For example, if an x-ray apparatus is utilized, if a hole or tear exists, the x-rays will be attenuated to a lesser extent than if the work product was structurally intact. Also, for work products composed of raw meat, the density of fat, bones, and cartilage is different from the density of the meat. This density variation results in a difference in the attenuation of the x-rays passing through the work product. For example, the density of bone is greater than the density of the meat. Thus, the x-rays passing through the bone will be attenuated to a greater extent than the x-rays passing through the meat. As a consequence, by the scanning process, the existence as well as the position and size of the defects in the work product may be ascertained. Examples of the foregoing scanning devices are disclosed in U.S. Pat. No. 6,563,904, incorporated by reference herein.

Although the foregoing description discussed scanning by use of a video camera and light source, as well as by use of x-rays, other three-dimensional scanning techniques may be utilized. For example, such additional techniques may be by ultrasound or moiré fringe methods. In addition, electromagnetic imaging techniques may be employed. Thus, the present invention is not limited to use of video or x-ray methods, but encompasses other three-dimensional scanning technologies.

Various types of cutting devices 18 may be utilized to cut the work product 14 into smaller end portions. Examples of cutting devices include high-speed water jets, lasers, rotary saws, hacksaws, guillotines, and band saws. Examples of a high-speed water jet cutting system are disclosed by Rudy, U.S. Pat. No. 5,365,816 and Pfarr et al., U.S. Pat. No. 5,868,056, incorporated by reference herein. The processor 22, operating under the portioning software, can control the cutting path of the cutting devices 18 to automatically segment the work product into a set of smaller end product portions.

As shown in FIG. 1, slicer 20 may be located either upstream or downstream from the cutter 18. Various types of slicers may be utilized to slice the work product into one or more desired thicknesses. For example, the slicer may be in the form of a high-speed water jet, a laser, a rotary saw, a hacksaw, or band saw. Also, the slicer may be adjustable so that a desired thickness of the work product is obtained. Such adjustment may be under the control of the processor 22 operating the portioning software.

In the embodiment shown in FIG. 2, the slicer 20 is replaced by a flattener 32, which may be used to flatten the work product 14 either before or after portioning the work product by use of the cutter 18. Flatteners are articles of commerce, and they may be of different forms. In one example, the flattener can consist of a pair of moving belts, with the bottom belt consisting of belt 42 of conveyor 12 as shown in FIG. 2. A second short belt, not shown, may be mounted above belt 42 and powered to move at the same speed as belt 42. The second belt may be adjustable in height to force the work product to a desired thickness. As with slicer 20, the flattener 32 may be operated under the control of the processor 22.

The slicer 20 and flattener 32 are used to alter the thickness of the work product. The work product, or portions of the work product, may be substantially thicker than desired for end products portioned from the work product. For example, if sandwich portions are to be cut from chicken breasts, part or the entire chicken breast may be substantially thicker than the desired sandwich portion. As a consequence, it is necessary to slice the chicken breast to obtain thickness that is within acceptable limits.

Rather than slicing the work product, it may be desirable instead to flatten the work product, especially if the thickness of the work product is not substantially greater than the desired thickness of the end products to be obtained from the work product. There may be a limit in the amount or the extent to which the work product can be flattened and still retain the product integrity or quality. The extent to which a work product may be flattened may vary depending on the nature of the work product. For example, if the work product is composed of tri-tip beef, the work product may not be flattened to nearly the extent to which the work product could be flattened if it is composed of ground beef.

As noted above, the slicer 20 and flattener 32 may be positioned either before or after the cutter 18. If positioned before the cutter 18, the slicer or flattener will operate on the entire work product. However, if the slicer or flattener is located downstream of the cutter 18, then the slicer or flattener can be selectively utilized on selected portions of the work product after the operation of the cutter 18. For example, the cutter 18 may be used to cut a specific portion from the work product, and that specific portion may be flattened by use of a flattener 32 to achieve a desired thickness as well as a desired product shape or area. The remainder of the work product that is not flattened can remain in its original thickness, which may be thicker than the flattened portion, thus available for other uses requiring thicker portions. A comparable situation may exist if the slicer 20 is used to slice selected portions of the work product that have been cut and not used to slice the entire work product, as would occur if the slicer 20 is located upstream of the cutter 18.

As a further embodiment, system 10 may be composed of two slicers, one upstream of the cutter 18 and another downstream of the cutter 18, thereby to increase the portioning options available. In some situations, depending on the thickness of the work product or the desired end products to be achieved from the work product, the entire work product may be sliced ahead of the cutter. Alternatively, a work product may better lend itself to being sliced after being cut due to the size of the work product or the desired end products to be achieved from the work product.

Likewise, in system 30 a flattener may be positionable both before and after the cutter 18, for reasons the same or similar to utilizing a system having a slicer before and after the cutter.

The systems 10 and 30 may be utilized to predetermine how the work product may be portioned by a combination cutting and/or slicing and/or flattening. As noted above, the slicing and/or flattening may occur before and/or after cutting to produce desired sets of end products. The end products may be of the same size or differing sizes depending on how the work product may be most efficiently portioned as well as depending on customer needs. To this end, the processor 22 may be utilized to model the scanned work product, including the impact of slicing or flattening the work product before and/or after the cutter 18 cuts the work product. In such modeling, the processor 22 may take into consideration defects in the work product as discussed above, including tears, holes, fat, bone, and cartilage. With such modeling of the work product, the processor can operate the portioning software to determine how to cut as well as how to slice and flatten the work product to achieve different product sets of mixes of end products to meet customer needs. For example, chicken breasts may be portioned into sandwich portions, chicken strips, and chicken nuggets. A particular mix of such end products may be required. The processor is capable of keeping such a desired mix in mind when modeling how to portion the work products into sets of end products. The present invention seeks to produce the desired quantity of each type of end product while minimizing the total trim or waste occurring during a production run.

The yield from portioning a work product in a particular manner may be predetermined by the scanning and/or portioning software so as to evaluate the desirability of the potential portioning strategy. In this regard, the scanning software may use algorithms that are the same or similar to those employed in the portioning software. It may be possible to portion a particular work product in different ways to achieve different sets of end products. Such sets can be evaluated by determining the yield of each portioning strategy.

Yield could be determined in different ways. In one definition, the yield could consist of a percentage, by weight, of the work product that meets marketable standards, as opposed to "trim" or "waste." There may be production and other requirements that must be taken into consideration instead of simply maximizing the weight of usable end products portioned from a work product. As noted above, to meet customer needs, a mix of end product types might be required; for example, from chicken breasts a certain amount of sandwich portions, strips, and nuggets may be needed.

As a further consideration of the yield from the work product, certain types of end products might have a higher economic value per unit weight. For example, the customer may be willing to pay a larger amount per unit weight for chicken breast sandwich portions than for chicken nuggets. Also as noted above, a quota might exist for various types of end products that may be portioned from a work product. The goal would be to meet the required quota while minimizing the total trim or waste from the overall production run.

An example of the decision process in determining what end products to obtain from a work product and then how to portion the work product to achieve the selected end products is shown in FIGS. 3A through 3E. Beginning in FIG. 3A, the process 50 begins with scanning the work product (W/P) at step 52. This scanning information is sent to a processor, such as processor 22, which utilizes such information in a scanning program to determine at step 54 the height profile of the work product throughout the entire area of the work product. Such height profile information can then be used at step 56 to establish a volume distribution of the entire work product, which information can be used to make other determinations, including the weight of the work product using an assumed density for the work product. At step 58, the processor also evaluates the scanning data to determine whether or not any defects exist in the work product. As noted above, such defects may include tears or holes in the work product. Also, excessive fat may be considered to be a defect. Other defects might include the presence of bone or cartilage in the work product. From the scanning data, the processor is able to ascertain not only the presence of the defect, but also the nature of the defect, its location, as well as its size.

Next, at decision point 60, using the scanning software, the modeling process inquires as to whether the work product will be sliced before or after cutting. If the work product is substantially thicker than required for the end products, then an option may be to slice the work product before cutting, so this possibility is modeled. At the next decision point 62, modeling of the work product takes into consideration whether or not any defects exist in the work product as determined in prior step 58. If defects do exist, then such defects are taken into consideration during the modeling that occurs in step 64. In step 66 the processor, operating under the portioning software, determines how to cut the work product as modeled, and the yield is calculated at step 68. The manner in which the processor determines how to cut the modeled work product will depend on the yield strategy desired, whether the strategy is to maximize the weight of the usable output products or to maximize the economic value of the end products, or to meet established quotas for different types of work products, or other criteria. The processor may make more than one determination as to how to cut the work product to enable different yield strategies to be compared.

If at decision point 62 no defects occurred in the work product, then step 70 would be pursued rather than step 64, wherein the work product would be modeled without having to consider any defects. Thereafter, in step 72, the computer using the portioning software, determinations as to how to cut the work product would be made in a manner similar to that described above with respect to step 66. Likewise, yield from the potential portioning strategy would be determined at step 74 in a manner described above with respect to step 68.

Figure 3A:
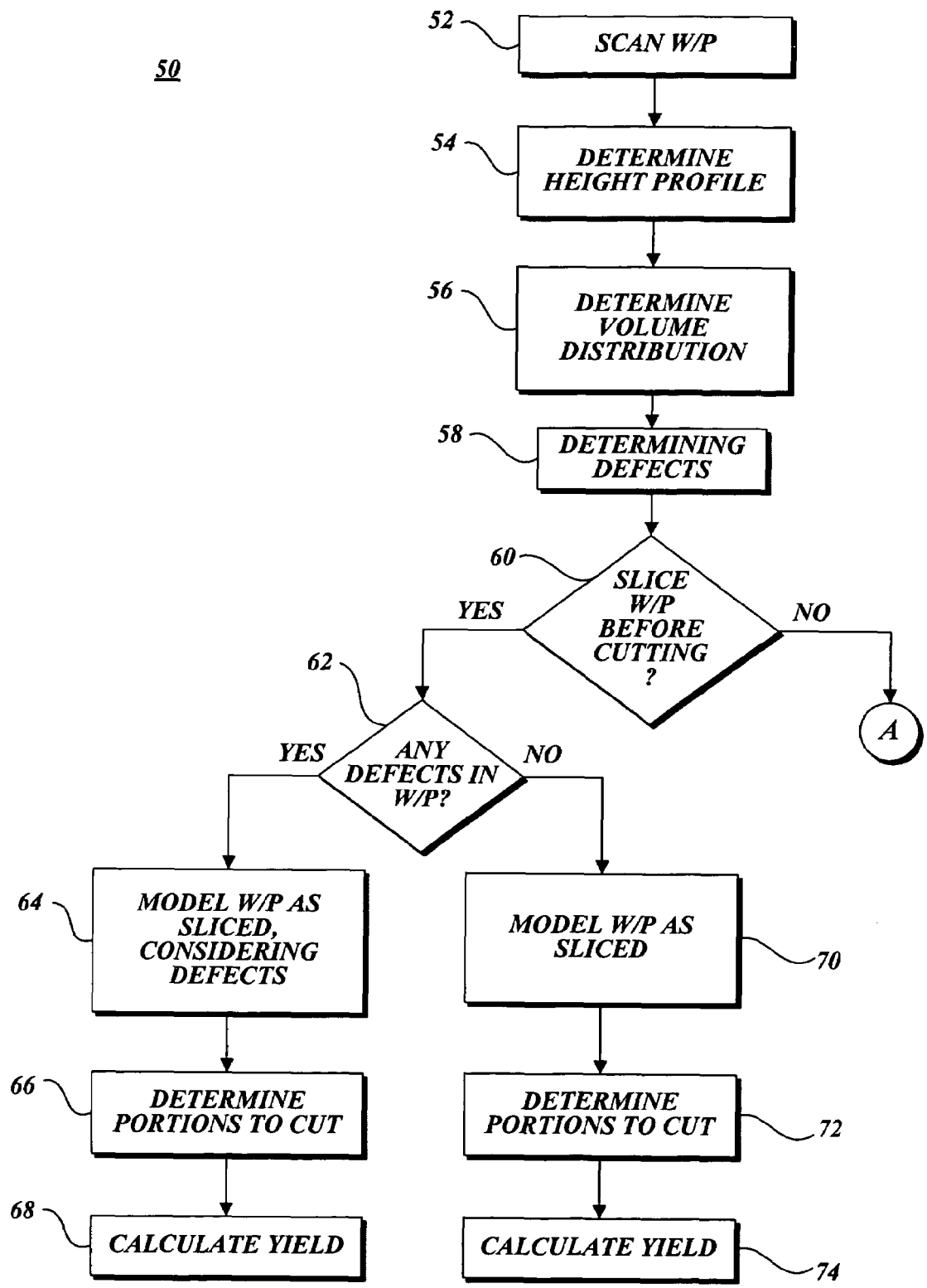
FIG. 3 is a flow diagram of a disclosed embodiment.
Figure 3B:
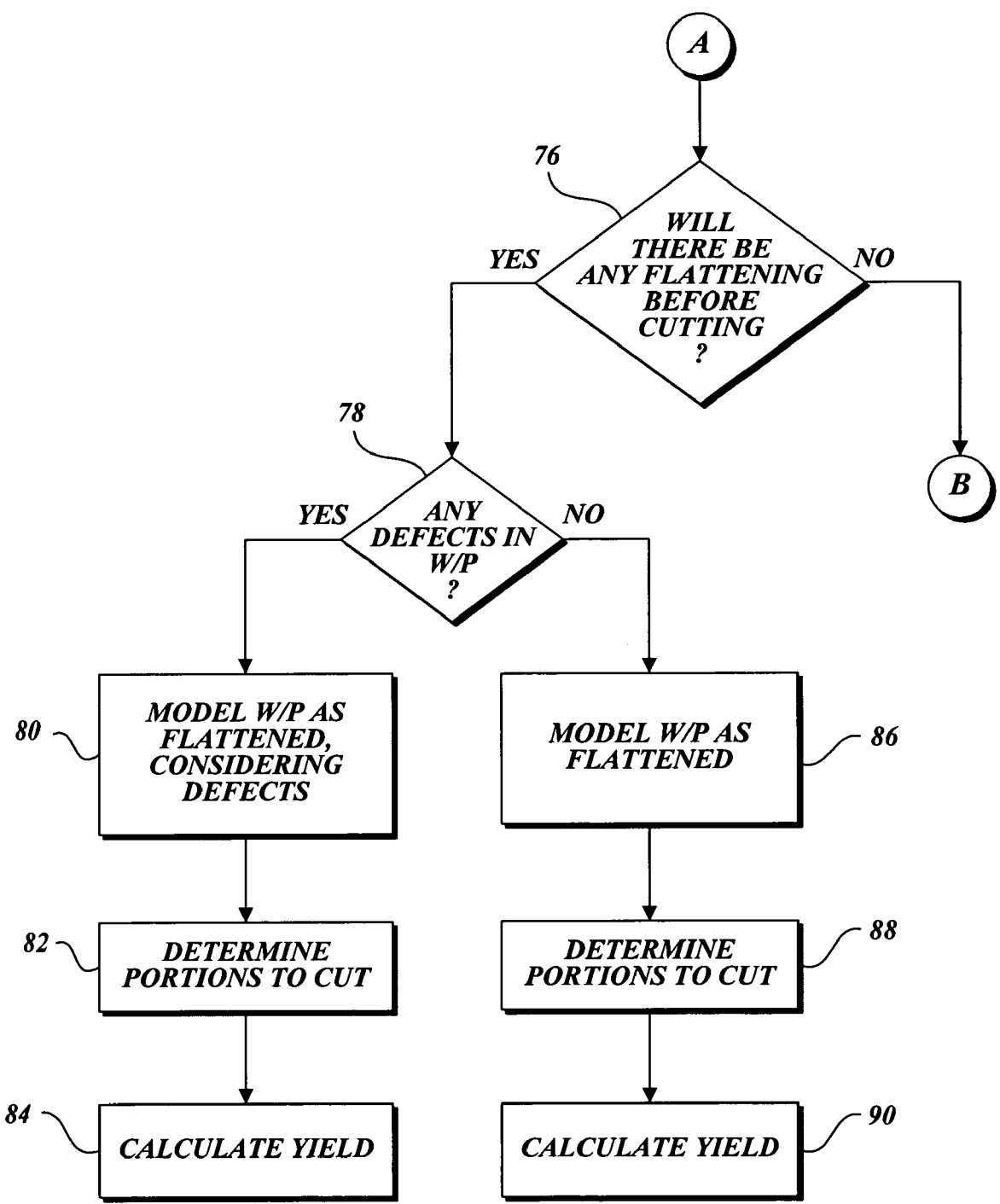
Figure 3C:
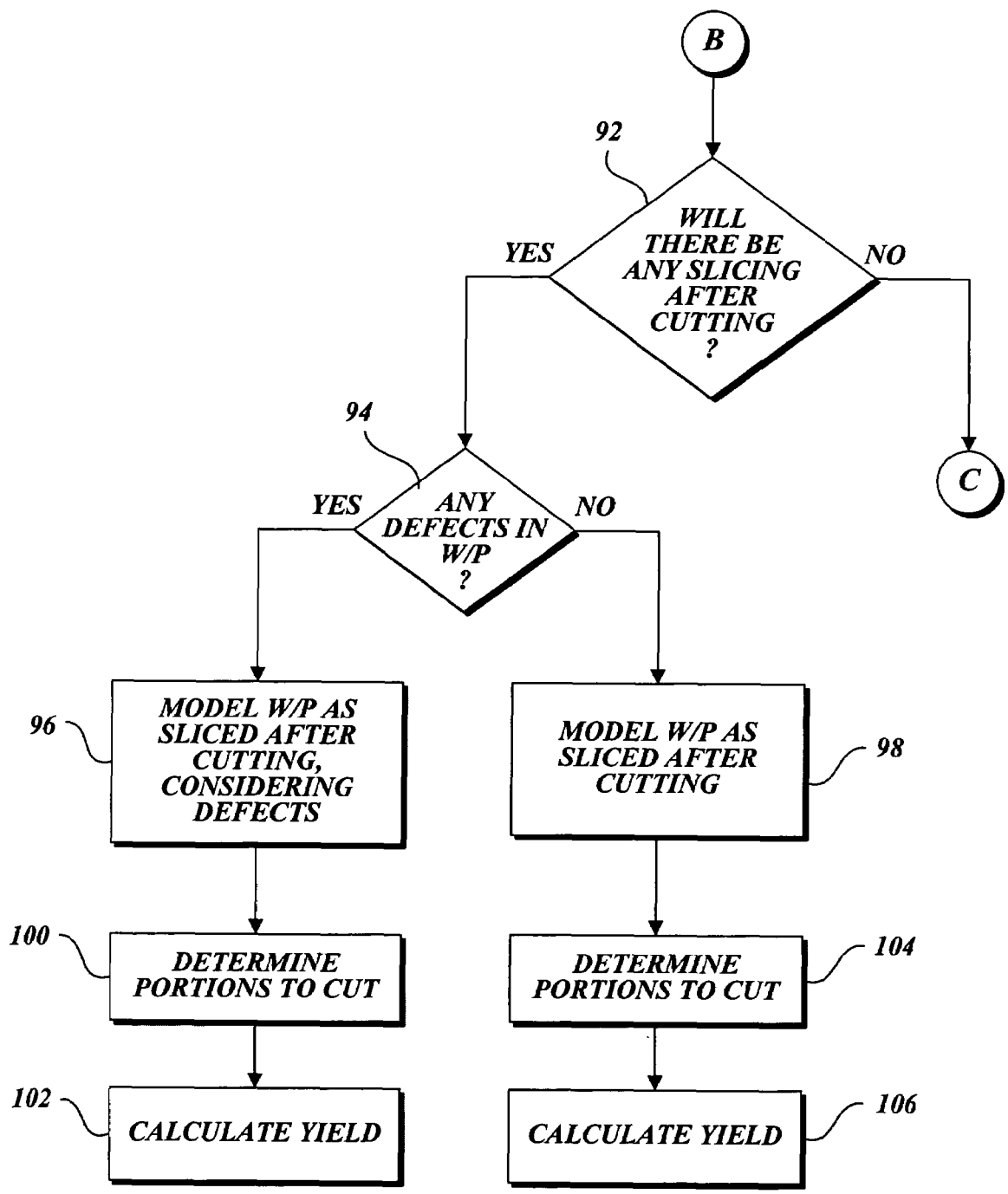
Figure 3D:
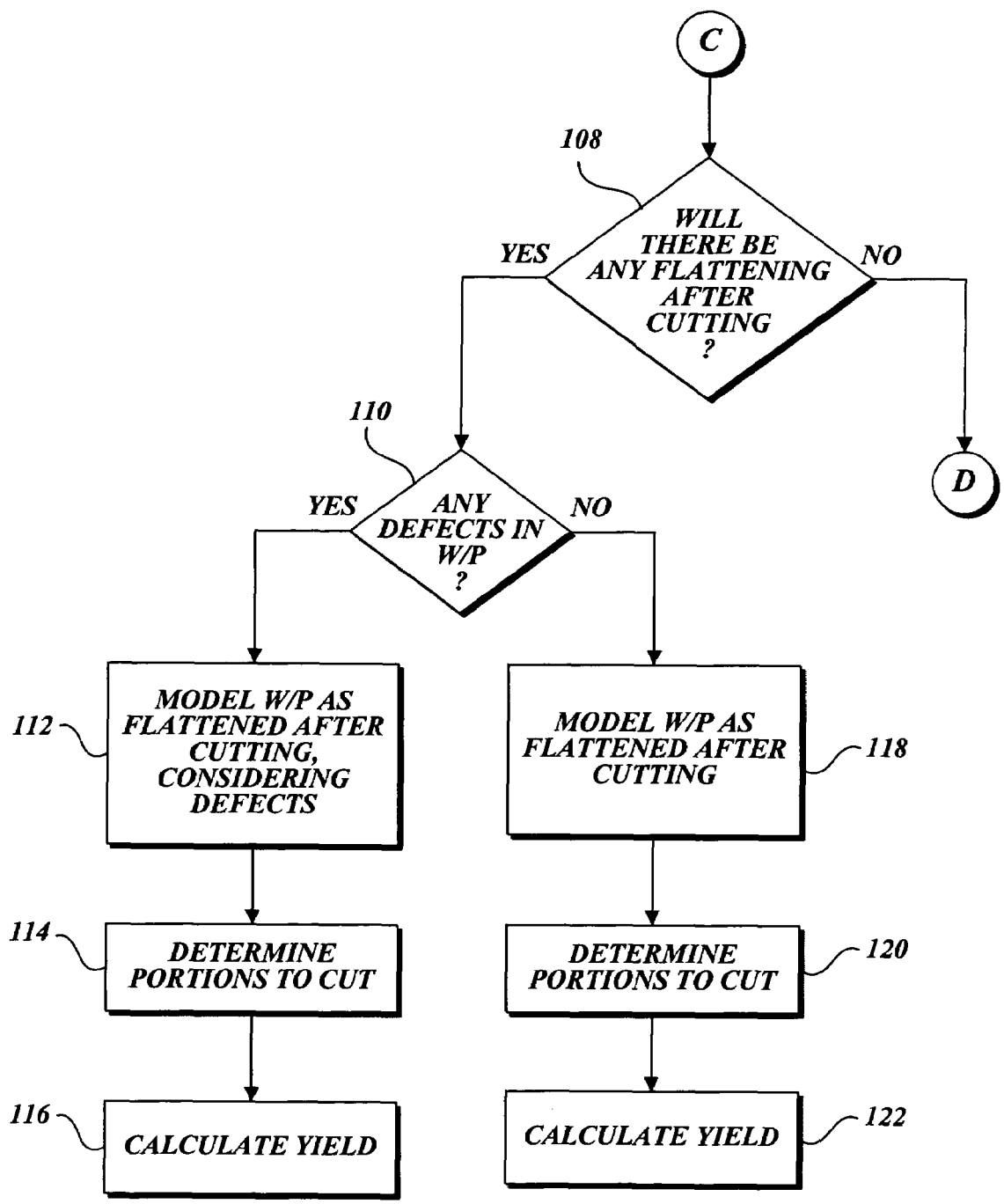
Figure 3E:
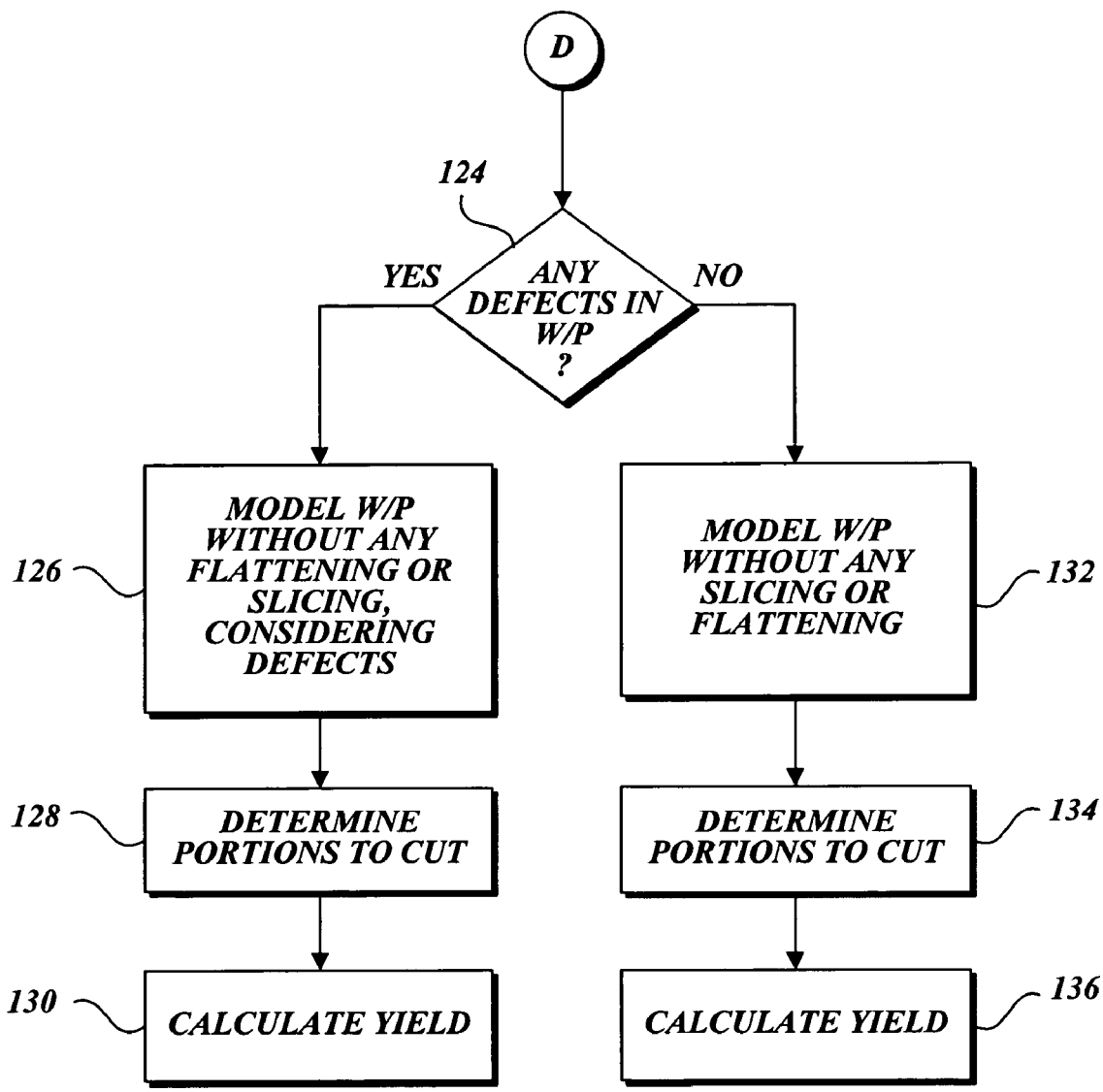

If slicing were not to occur before cutting, then the process proceeds to decision point 76, shown in FIG. 3B, pertaining to whether or not the work product would be flattened before cutting. Alternatively, even if potential portioning strategies were investigated wherein slicing would occur before cutting, processor 22 may still investigate other strategies applicable to the work product, including flattening before cutting to determine what yields are achievable under this strategy. In this regard, the next step 78 of the disclosed embodiment is to determine whether any defects exist in the work product. If such defects do occur, then modeling of the work product using the scanning software at step 80 takes this into account. Then in step 82, determinations are made as to how to potentially cut the work product, and then a yield from the various potential cutting strategies is determined at step 84 using the portioning software. The cutting strategy determination at step 82 is similar to that at step 66, and the yield calculation at step 84 is similar to that at step 68.

If no defects existed in the work product, then the disclosed program would proceed to step 86 rather than to step 80, wherein the work product would be modeled as flattened prior to cutting. Thereafter, at step 88, determinations would be made using the portioning software as to how the work product might be cut to achieve various end product sets and then the yield for each of the cutting strategies would be determined at step 90, similarly to steps 66 and 68 discussed above.

The disclosed embodiment 50 also contemplates ascertaining cutting strategies and yields for slicing and flattening the work product after cutting. As noted above, by slicing or flattening after cutting, the entire work product need not be sliced or flattened. Rather, selected portions of the initial work product could be sliced or flattened. In addition, as an overall strategy, a decision may be made in advance to only slice or flatten after cutting, in which case the embodiment 50 would proceed directly from step 58 to step 92, shown in FIG. 3C. At the next step 94, a determination is made as to whether or not it is necessary to take into consideration any defects in the work product. If defects do exist, then modeling at step 96 occurs, taking into consideration such defects. However, if no defects exist, then modeling occurs at step 98 without consideration of defects. Following step 96, the processor using the portioning software determines one or more cutting strategies for the work product at step 100, and then the yield for each such cutting strategy is determined at step 102. These two steps are similar to step 66 and 68, discussed above. If modeling occurs under step 98 rather than step 96, then at step 104, cutting determinations are made by the processor software, and the yield of each such cutting determinations is ascertained at step 106. Steps 104 and 106 are similar to steps 66 and 68, discussed above.

Because of the nature of the work product, slicing after cutting may not be necessary or feasible, whereas flattening after cutting may be feasible. So after step 58, the present process proceeds directly to step 108, shown in FIG. 3D. However, even if slicing after cutting is a potential strategy, the possibility of flattening after cutting may also be investigated as a strategy, in which case the processor would investigate this possibility, even if the possibility of slicing after cutting had already been investigated.

To pursue the possibility of flattening after cutting at decision step 110, the existence of defects in the work product is taken into consideration. If a defect does exist, then the embodiment moves on to step 112, wherein the work product is modeled by the scanning software, taking into consideration such defects. Cutting strategies are determined by use of the processing software at step 114 and the yield of these cutting strategies is determined at step 116 in a manner similar to steps 66 and 68, discussed above. If no defects exist in the work product, then modeling of the work product occurs at step 118 rather than at step 112. Thereafter cutting determinations are made at step 120 and then the yields of such determinations are calculated at step 122.

There may be a possibility that, due to the nature of the work product, there is no need to consider slicing or flattening the work product, either before or after cutting. In this case, the process 50 may proceed to decision point 124, shown in FIG. 3E, as to whether any defects exist in the work product. If a defect does exist, then modeling of the work product using the scanning program occurs at step 126, taking into consideration such defect. Thereafter, at step 128, using the portioning program, determinations are made as to how the work product may be cut and the yield of such determinations is calculated at step 130, similarly to steps 66 and 68 discussed above. On the other hand, if no defects occur, then modeling of the work product occurs at step 132. Thereafter, determinations as to how the work product may be cut are made at step 134 and then the yield of each such determination is calculated at step 126.

The various applicable yields from the different portioning strategies and options set forth in FIGS. 3A through 3E are compared and analyzed, so that a particular cutting strategy for a specific work product can be chosen. Once the cutting strategy is chosen, the processor, using the portioning program, controls the operations of the cutter as well as applicable slicers and flatteners, to carry out the selected cutting strategy.

FIGS. 3A through 3E disclose only one possible method for evaluating different portioning strategies for the work product. Other methods are possible, for example, the question as to whether any defects exist in the work product may be considered earlier in the process, before determining whether or not slicing or flattening is to take place prior to or after the cutting of the work product. Also, the yield can be determined prior to any determination as to how to actually cut, slice or otherwise process the work product. Thus, the determination of the potential yield from the work product is used in making the decision as to what set of end products to select to achieve from the work product.

While illustrative embodiments have been illustrated and described, it will be appreciated that various changes can be made therein without departing from the spirit and scope of the invention. For example, the scanning software and portioning software may be integrated into a single program operated by a single computer. Also, at various points the present invention has been described in conjunction with portioning chicken, and in particular chicken breasts. The present invention can be used with other meat products such as beef steaks, fish fillets, pork steaks, turkey breasts, duck breasts, goose breasts and ham slices. Moreover, the present invention can be used with other types of foods such as fruits and vegetables.

The invention claimed is:

1. A system for pre-analyzing how to process food products capable of being portioned to achieve an optimum yield of end products from the food products, comprising:
   (a) a scanner for scanning a food product,
   (b) a data processor for receiving data from the scanner and using such data to develop a volume distribution of the food product that has been scanned;
   (c) wherein the data processor is programmed to predetermine potential sets of end products of predetermined physical parameters achievable by portioning the food product taking into consideration cutting and potentially flattening the food product and whether the flattening should occur either before or after cutting the food product; and further taking into consideration:
      (i) if flattening the food product should occur before cutting, determining potential end product sets by first flattening and then cutting the food product;
      (ii) if flattening of the food product should occur after cutting, determining the potential end product sets by first cutting and then flattening the food product; and
      (iii) if the determination is made not to flatten the food product, determining potential end product sets without any flattening;
   (d) wherein the data processor is programmed to select one of the potential sets of end products achievable by portioning the food product prior to actual cutting occurring and prior to optionally flattening of the food product either before or after cutting the food product.

2. The system according to claim 1, wherein in predetermining potential sets of end products achievable from the food product the data processor is programmed to take into consideration defects in the food product.

3. The system according to claim 2, wherein in taking into consideration defects in the food product, the data processor considers defects selected from a group consisting of tears, holes, fat, bones and cartilage.

4. The system according to claim 1, wherein in determining the predetermined physical parameters of the potential sets of end products, the data processor is programmed to consider parameters selected from a group consisting of the weight, area, shape, thickness, length and width of the end products.

5. The system according to claim 1, further comprising a portioner system for portioning the food product according to the selected set of the potential sets of end products.

6. A method of processing a raw meat product to achieve an optimum yield of portioned end products by cutting and by one of optionally slicing and/or flattening, comprising:
   (a) scanning the raw meat product,
   (b) developing a volume distribution of the raw meat product after scanning the raw meat product from data obtained during the scanning step;
   (c) modeling how the scanned raw meat product may be divided into potential portioned sets of desired end product sets based on predetermined physical parameters of the desired end product sets prior to dividing the modeled raw meat product into portions, said modeling comprising:
      (i) determining whether or not the raw meat product should be sliced and/or flattened, and if so, whether the slicing and/or flattening should occur either before or after cutting the raw meat product;
      (ii) if slicing and/or flattening of the raw meat product should occur before cutting, modeling the raw meat product as potentially sliced and/or flattened and then determining how to cut the raw meat product as modeled;
      (iii) if slicing and/or flattening of the raw meat product should occur after cutting, modeling the raw meat product as potentially sliced and/or flattened after cutting and then determining how to cut the raw meat product as modeled; and
      (iv) if the determination is made not to slice and/or flatten the raw meat product, modeling the raw meat product without any slicing and/or flattening and then determine how to cut the raw meat product;
   (d) processing the raw meat product to achieve the selected set of the potential portioned sets of desired end product sets.

7. The method of claim 6, wherein the step of analyzing how the modeled raw meat product may be divided into potential portioned sets of desired end product sets, further comprising taking into consideration defects in the raw meat product.

8. The method according to claim 7, wherein the defects in the raw meat product are ascertained by analyzing the data obtained during the scanning of the raw meat product.

9. The method according to claim 7, wherein the defects in the raw meat product are selected from a group consisting of tears, holes, fat, bone and cartilage in the raw meat product.

10. The method according to claim 6, wherein the step of analyzing the modeled raw meat product to determine how the raw meat product might be divided into potential portioned sets of desired end product sets includes considering physical parameters of components of the end product sets selected from a group consisting of weight, area, shape, thickness, length and width of the end products.

11. The method according to claim 6, wherein processing of the raw meat product comprises sorting the raw meat product into various categories for subsequent processing.

12. The method according to claim 6, wherein the raw meat product is selected from a group consisting of chicken breasts, beef steaks, fish fillets, pork steaks, turkey breasts, ham slices.

* * * * *